M. LIKES.
Wagon-Seats.
No. 143,086.　　　　　　　　Patented September 23, 1873.
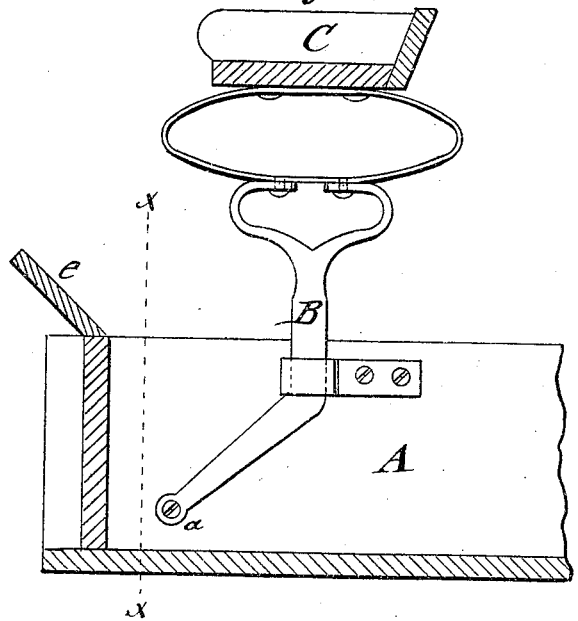
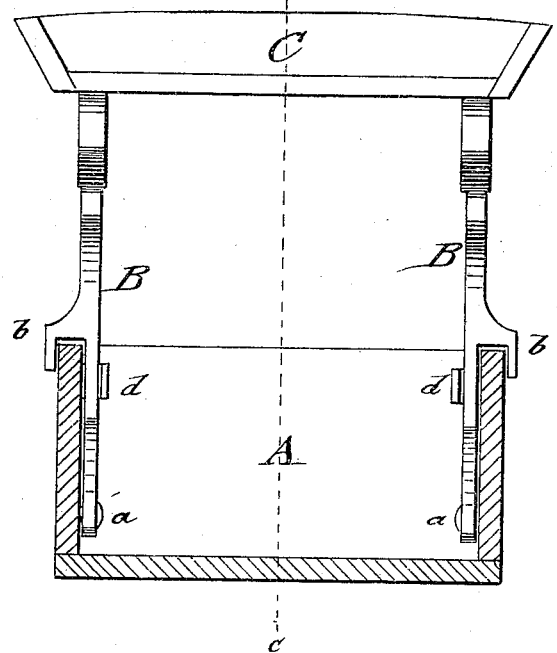
Witnesses:
E. Wolff
J. Sedgwick
Inventor:
M. Likes
Per Munn & Co.
Attorneys.

UNITED STATES PATENT OFFICE.

MICHAEL LIKES, OF MANSFIELD, OHIO, ASSIGNOR TO HIMSELF AND J. H. BARR, OF SAME PLACE.

IMPROVEMENT IN WAGON-SEATS.

Specification forming part of Letters Patent No. 143,086, dated September 23, 1373; application filed July 19, 1873.

*To all whom it may concern:*

Be it known that I, MICHAEL LIKES, of Mansfield, in the county of Richland and State of Ohio, have invented a new and Improved Wagon-Seat, of which the following is a specification:

In the accompanying drawing, Figure 1 represents a vertical longitudinal section of my improved wagon-seat on the line $c\ c$, Fig. 2; and Fig. 2, a vertical transverse section of the same on the line $x\ x$, Fig. 1.

Similar letters of reference indicate corresponding parts.

The object of my invention is to furnish wagons and other vehicles with seats arranged in such manner that they may be easily thrown out of the way for loading, and then set back for the driver, the whole being constructed in a simple, convenient, and practical manner, without weakening the sides of the box by re-setting. My invention consists in providing the wagon-seat with risers or supports, which are of angular form in one direction, and pivoted to the sides of the wagon-box, and produced under a certain angle, so that the seat is not only thrown forward, but inclines at the same time beyond the foot-board.

In the drawing, A represents the body or box of a wagon or other vehicle, to whose sides are pivoted at $a$, near the bottom and front board, the risers or supports B of the seat C. The riser B is made of suitable material, with that portion which swings along the side of body A bent at an angle with the upper portion, upon which latter rests the seat. A hook-shaped side lug, $b$, of riser B, of the upper part of the same, takes hold of the sides of body A, and supports the riser securely thereon. In case of a double bed, inside staples or hooks $d$ are applied for supporting the seat in position for the driver, in which case the side lug of the riser would not be necessary.

For loading the wagon the seat is thrown over on pivots $a$ toward the foot-board $e$, the lower parts of supports B resting on the front board of body A, the upper parts with the seat projecting in inclined position beyond the foot-board $e$, on account of the angle of the supports B. The wagon may, therefore, be loaded without being interfered with by the seat, which is swung backward into its regular position when the loading is finished.

Having thus described my invention, I claim as new and desire to secure by Letters Patent—

The angular supports or risers B, pivoted at their lower ends to the sides of a wagon or other vehicle, and supporting at their upper ends a seat, C, in combination with a stop, as and for the purpose specified.

MICHAEL LIKES.

Witnesses:
   A. J. MACK,
   JNO. JENNER.